Fig. 2.

INVENTOR.
Allen H. Lloyd and
Eric H. Bayer.
BY
Fishburn and Gold
ATTORNEYS.

Fig. 3.

INVENTOR.
Allen H. Lloyd and
Eric H. Bayer.
BY
Fishburn and Gold
ATTORNEYS.

ively, i.e., on an axis normal to the face thereof,
through a sufficient angle to deposit it in the containers
United States Patent Office 3,002,746
Patented Oct. 3, 1961

3,002,746
COLLATOR
Allen H. Lloyd, Milford, Ohio, and Eric H. Bayer, Prairie Village, Kans., assignors to Hallmark Cards, Incorporated, Kansas City, Mo., a corporation of Missouri
Filed May 8, 1959, Ser. No. 811,987
9 Claims. (Cl. 270—58)

This invention relates to a collator, and more particularly to apparatus for picking up cards, envelopes or the like from a plurality of hoppers and depositing them simultaneously into a plurality of containers located therebelow on a conveyor belt.

With the present high production requirements it is economically impracticable to manually count the cards for each container or box before shipping. In using a collator machine for this purpose the operation may be performed at relatively low cost. However, to readjust the present day collators for different size cards and to set the involved mechanism for a maximum of accuracy, complex and consequently long time consuming operations are still necessary.

It is, therefore, the principal object of the present invention to provide a collator device for handling cards of different sizes without complex adjustment; to provide such a device for picking a card or envelope from a plurality of hoppers simultaneously and lowering the cards or envelopes to containers momentarily held stationary on a moving belt and turning or rotating the cards through a certain angle on an axis normal to the face of the cards while lowering same into the containers; to provide a framework structure having a platform for the workmen for overseeing the mechanism and for adjusting the same during operation if that becomes necessary; to provide a conveyor belt on the frame for movement of a plurality of boxes thereacross; to provide a plurality of hoppers on the frame above said belt; to provide means for mounting the hoppers for stacking the cards therein at a forty-five degree angle with respect to the containers on the belt; to provide means on the hoppers for quickly and easily adjusting the same to accommodate envelopes or cards of different size; to provide means for picking the cards or envelopes from the lowermost one in the stack and turning or rotating the card or envelope while in flight therefrom to the containers below simultaneously; and to provide stop means on the frame adjacent the movable belt for stopping the containers at predetermined intervals to allow the cards to be deposited therein, and then when the pick-up mechanism is moving back for another card the stop mechanism will allow the containers to move one step forward so as to be in position to receive a card from the next succeeding hopper in the series.

Other objects of the present invention are to provide suction means for the pick-up mechanism for moving the cards from the hoppers to the containers; to provide valve means to automatically admit and withdraw air to and from the suction means of the pick-up mechanism; and to provide a suction pump for creating the suction in the pick-up mechanism.

Still further objects of the present invention are to provide standards on the frame upon which are mounted a plurality of rocker arms having a shaft on their forward ends upon which the pick-up mechanism is mounted; to provide means including a motor for rocking the arms up and down and simultaneously causing rotation of the shaft carrying the pick-up mechanism whereby the pick-up mechanism will pick up a card or envelope from the stack and deliver it to the container, and at the same time rotating the card or envelope transversely, i.e., on an axis normal to the face thereof, through a sufficient angle to deposit it in the containers at a right angle to the direction of motion of the belt upon which they are carried; to provide cam means on the shaft on the front end of the rocker frame for effecting the transverse rotation of the card while it is in flight from the hopper to the container; and to provide a gate control on the conveyor frame for automatically releasing containers to permit them to move forward with the moving belt one space simultaneously after delivery of a card from the hopper to each container so that the containers will be moved forwardly on the belt one space automatically as required.

Still further objects of the invention are to provide means on the gate control for simultaneously holding the containers on the belt for depositing one or more cards in the containers before they are moved forwardly to position under the next succeeding hopper; and to provide a device of this character simple and efficient in operation.

In accomplishing these and other objects of the invention we have provided improved details of structure, the preferred forms of which are shown in the accompanying drawings, wherein.

Figures 10, 11, 12:
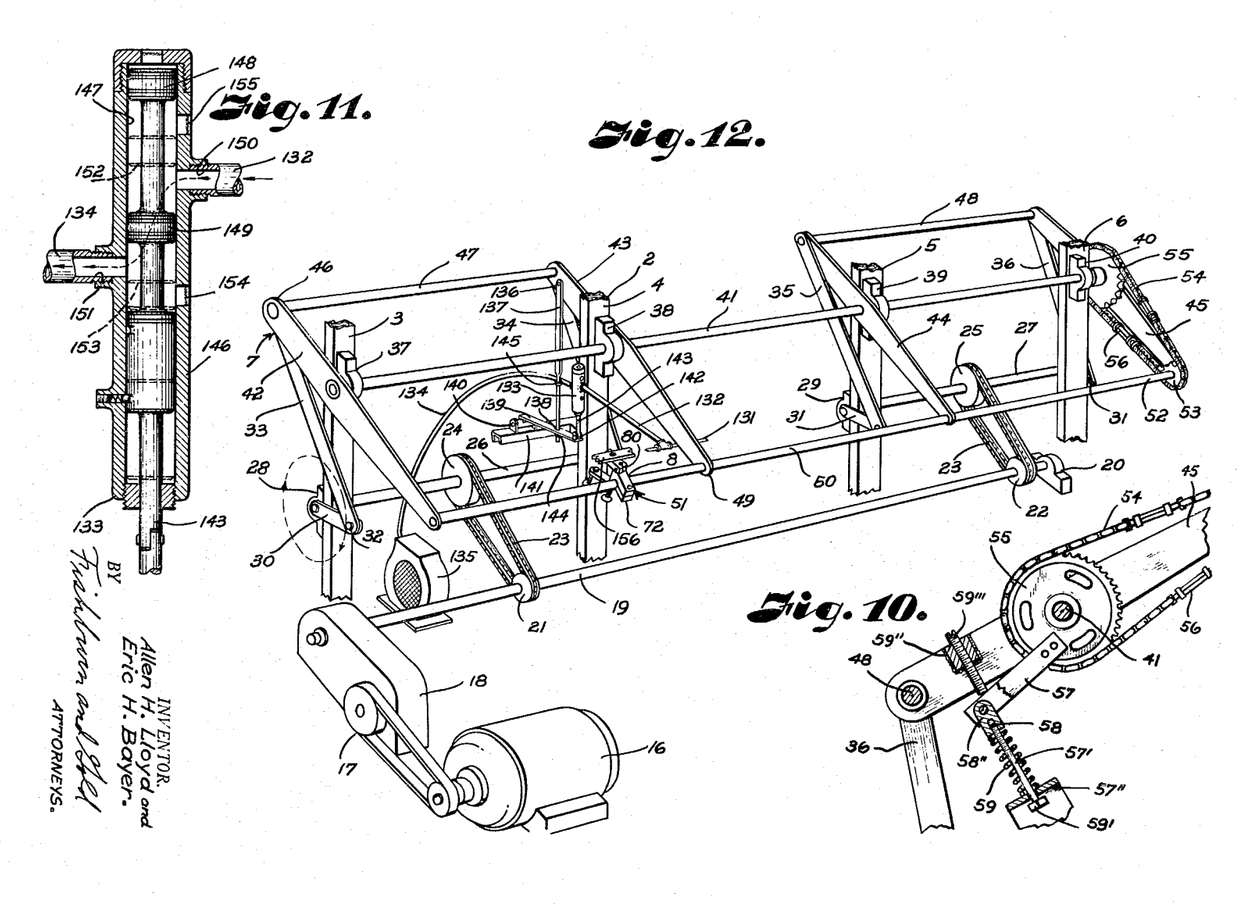
FIG. 10 is a vertical sectional view of the chain and sprocket arrangement for rotation of the pick-up units.
FIG. 11 is an enlarged sectional view through an air valve for controlling the vacuum or suction through the card pick-up nozzles.
FIG. 12 is a diagrammatic view of the power train of the collator.

Referring more in detail to the drawings:

1 designates a collator or counting machine in accordance with the present invention and which includes a frame structure 2 with vertical frame standards 3, 4, 5 and 6 (FIG. 12). Operatively mounted upon the frame standards is a mechanism 7 adapted to operate a pick-up structure 8 for picking up greeting cards or the like 9 from a plurality of hoppers or chutes 10 containing said stacks of cards 9. The pick-up mechanism 8 delivers the cards 9 to a plurality of boxes or containers 11 located below the hoppers 10 on a continuously running conveyor belt 12. The boxes 11 remain in a stationary position on conveyor 12 while the cards are delivered by simultaneously operated gates or stops 13 with respect to the pick-up structure 8. An operator's platform 14 is provided for easy access to switches and controls 15 above the hoppers 10 working in conjunction with other means, which are not shown in the drawings due to their secondary importance as far as the present invention is concerned.

To operate the collator 1 a motor 16 (FIG. 12) is provided having driving connection through a variable speed drive 17 with a speed reducer 18. A jack shaft 19 extends below the collator in a parallel relation thereto and is mounted in bearings 20 with one end of shaft 19 extending into the speed reducer for driving engagement with a gear reduction unit (not shown). Mounted on shaft 19 near the forward and rearward ends thereof are sprockets 21 and 22 for chains 23 adapted to engage over larger sprockets 24 and 25 on crank shafts 26 and 27 to provide a driving connection between shaft 19 and said crank shafts. The crank shafts 26 and 27 are rotatably mounted in bearings 28 and 29, said bearings being suitably secured to the vertical frame sections 3, 4, 5 and 6 with the crank shaft 26 between sections 3 and 4, and the crank shaft 27 between sections 5 and 6 as shown in FIG. 12.

Rigidly mounted to each end of the crank shafts are twin cranks 30 and 31 which have their ends pivotally secured as at 32 to connecting rods 33, 34, 35 and 36 extending upwardly therefrom. Suitably secured to the forward sides of frame sections 3, 4, 5 and 6 and above the bearings 28 and 29 are bearings 37, 38, 39 and 40 adapted to permit free rotation of a shaft 41 extending throughout the length of the collator. Rigidly mounted on a shaft 41 approximately at their center portions and next to the bearings 37, 38 39 and 40 are arms 42, 43, 44 and 45 as shown in FIG. 12. The rearward ends 46 of said arms are pivotally connected to the upper ends of the connecting rods 33, 34, 35 and 36 by shafts 47 and 48 with shaft 47 extending between arms 42 and 43 and shaft 48 between arms 44 and 45.

Rotatably mounted within the forward ends 49 of the arms 42, 43, 44 and 45 is a shaft 50 for a plurality of card pick-up units 51. Keyed to one end 52 of shaft 50 next to arm 45 is a sprocket 53 for a chain 54, said chain engaging over a sprocket 55 and being provided with chain tighteners 56 for adjusting the sprockets 53 and 55 with respect to each other. The sprocket 55 is mounted in such a manner that the shaft 41 and the arm 45 may rotate independently with respect to the sprocket 55 which remains stationary except at the moment of pickup, when it rotates with the arms, thus stopping the rotation of sprocket 53 and the pick-up units 51 to prevent any sliding of the pick-up units on the card when in pick-up position.

In the present structure the sprocket 55 fits loosely over the end of shaft 41 and has a rearwardly extending arm 57 rigidly secured to one side thereof. A rod or bolt 57' extends upwardly through an opening in a bracket 57" on the standard 6 and is screw threadedly engaged in a threaded socket 58 of a lug 58" pivotally mounted to the end of the arm 57. A coil spring 59 surrounds the bolt 57' between the bracket 57" on the sprocket 55 and lug 58" to force the arm 57 on the sprocket 55 upwardly until the head 59' on the bolt 57' engages the bracket 57".

Figures 4, 5, 6:
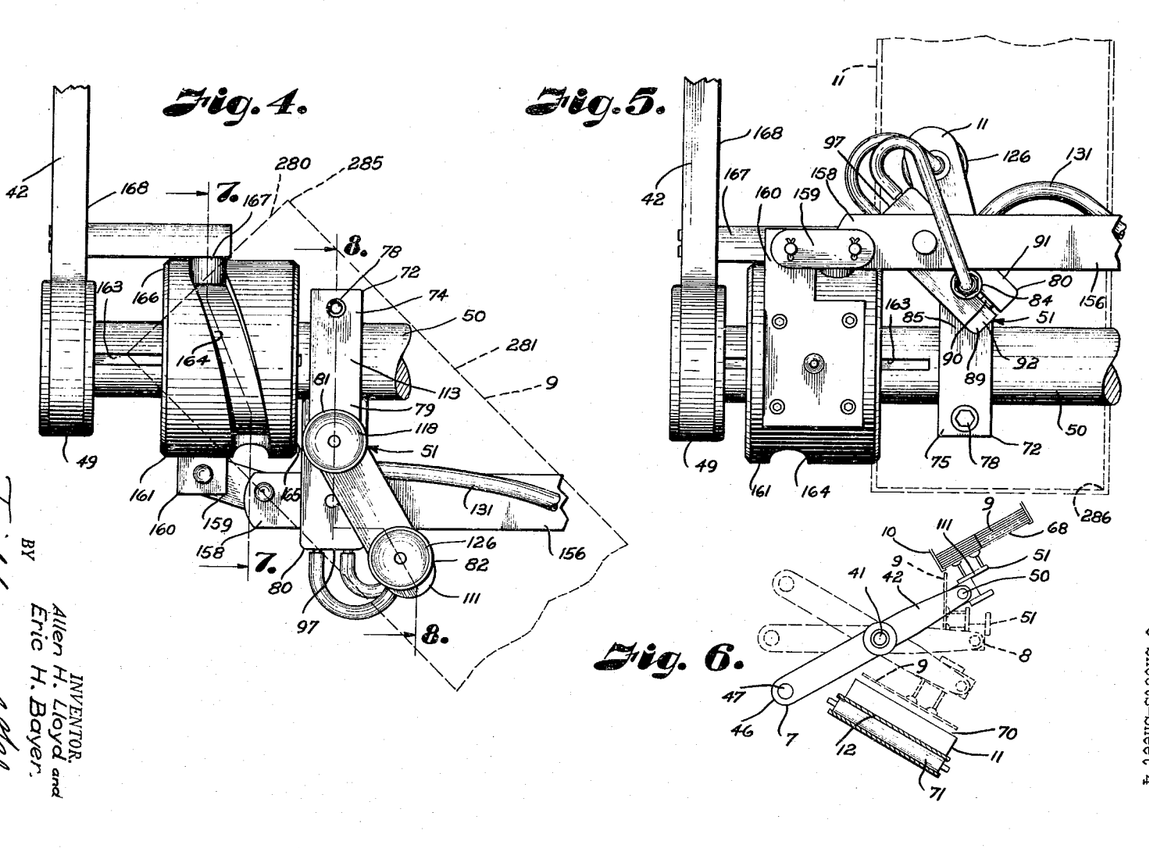
FIG. 4 is a plan view of the push cam and mounting thereof with the oscillating suction devices in a card pick-up position.
FIG. 5 is a plan view of the push cam arrangement with the suction devices shown in a card rotated or dropping position.
FIG. 6 is a diagrammatic view of the vertical card movement between pick-up and dropping position.

Suitably secured to the arm 45 between the shafts 41 and 48 is a block 59" provided with a threaded opening to receive threaded pin 59''' extending towards the arm 57. With this arrangement the pin 59''' may be adjusted to engage the arm 57 shortly before the pick-up units 51 contact the lowermost card on the hoppers 10 to rotate the sprocket 55 slightly with the arm 45 thus stopping further rotation of sprocket 53 and the pick-up units 51 to prevent sliding of the pick-up units on the card and to adjust the pick-up mechanism to contact said card at a right angle, as shown in FIG. 6, for a purpose later described.

The mechanism 7 for operating the card pick-up structure 8 so far described is operated by the motor 16, and due to the above-described drive and link connections will simultaneously swing the forward ends of the arms 49 with shaft 50 thereon up and down upon an axis provided by shaft 41. This up and down movement of the arms is restricted to a certain degree depending on the length of the cranks 30 and 31 and is in the present invention sixty (60) degrees as shown in FIG. 6. As the arms and shaft 50 swing up and down shaft 50 will rotate in opposite directions within the forward ends 49 due to the chain connection between the sprocket 55 and the sprocket 53 on shaft 50. In other words, by looking at the mechanism from a direction as shown in FIG. 6, shaft 50 will rotate in an anti-clockwise direction as the forward ends 49 of the arms swing down and clockwise as the arms move up. It is obvious that as shaft 50 rotates, the pick-up units 51 mounted thereon will follow the rotation (FIG. 6) for a purpose later described.

In the present structure twelve of such pick-up units 51 are secured to shaft 50 (FIG. 8), and above the line of travel of each unit are the hoppers or chutes 10 with stacks of greeting cards or the like 9. It is to be understood that any number of pick-up units and hoppers may be provided without departing from the subject of our invention. Each hopper consists of two connected side walls 60 and 61 in a rectangular relation to each other and which are inclined backwards at a sixty (60) degree angle from the vertical to provide a chute-like structure for the cards 9 and bring said cards in alignment with arms 42, 43, 44 and 45 and pick-up units 51 when they are in their uppermost position as at 62, FIG. 6.

Suitable brackets 63 are fastened to hoppers 10 and extend to a horizontal frame section 64 for a rigid mounting of each hopper or chute. The hoppers have an open side and front and the bottoms are also open except for adjustable stops 65 which are provided on said open lower ends of the hoppers 10 and consist of sheet metal sections or the like 66 which extend slightly over parts of the outer edges of the lowermost card as at 67 to keep the pile of cards in place and yet allow the lowermost card 68 to be pulled out by the pick-up units 51 due to the flexibility of the card. Each hopper is provided with adjustable guide brackets 69 to keep the piles of cards in proper alignment. The purpose of the adjustability of the guide brackets 69 is to accommodate different size cards. As shown in FIGS. 4 and 5, the cards 9 and thus hoppers 10 are set at a forty-five (45) degree angle (FIG. 4) with respect to the card containers or boxes 11 to which the cards are to be delivered by the pick-up units 51 for a purpose later described.

Figure 13:
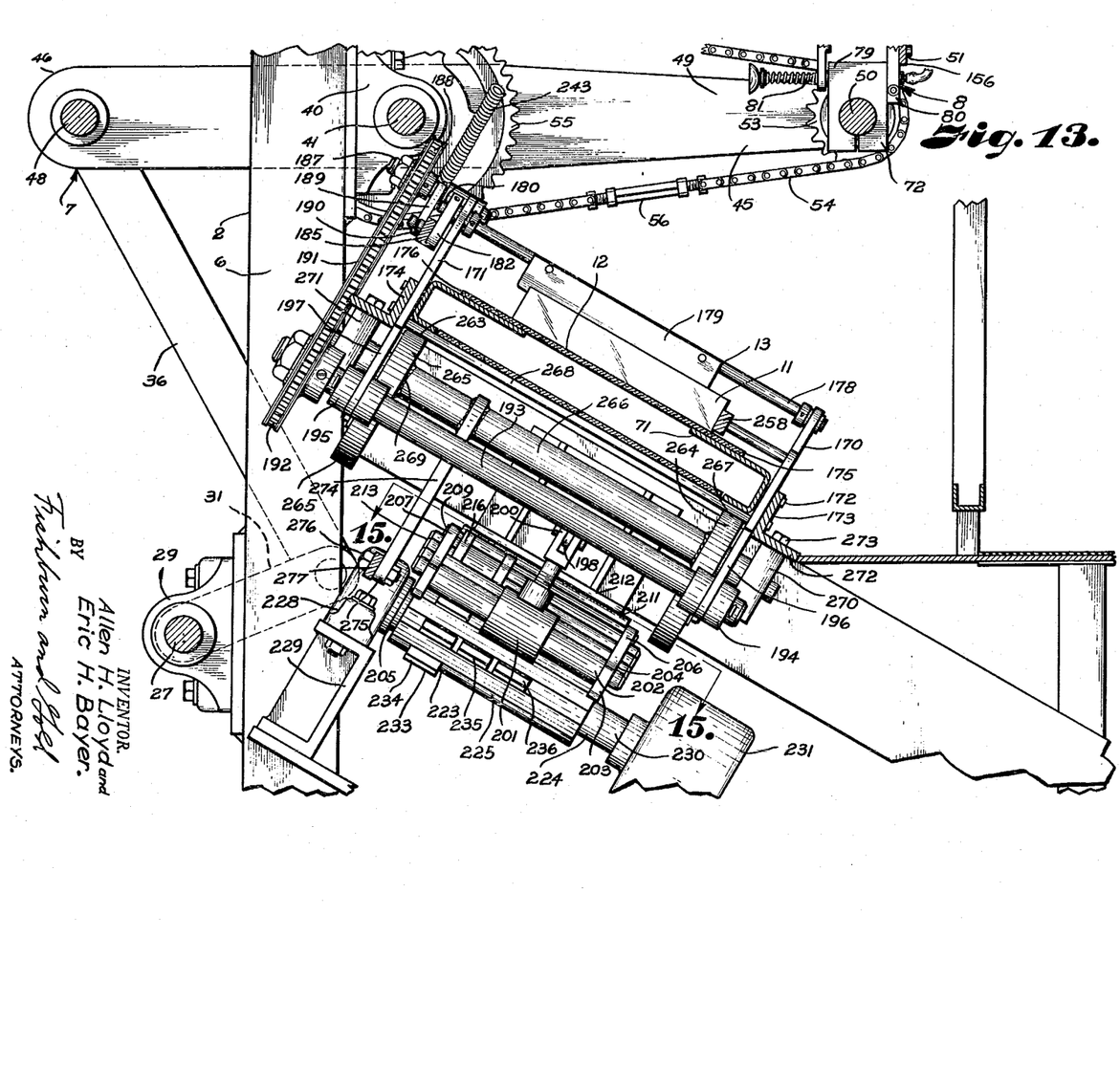
FIG. 13 is a transverse sectional view through a portion of the collator, particularly illustrating the counting mechanism and gate control.

The containers 11 are positioned below the line of travel of the pick-up units and at a thirty (30) degree angle from the horizontal or in alignment with the arms 42, 43, 44 and 45 when they are in their lowermost position as at 70 (FIG. 6) and said containers are delivered to their proper position by continuously moving the conveyor belt 12 which runs over suitable rollers on a frame structure 71 (FIG. 13). The gates or stops 13 are provided below each hopper and across the conveyor 12 to keep the containers 11 at a standstill while a card is dropped into the boxes by the pick-up units 51. Operation of said gates 13 will later be described.

The pick-up units 51 each have a clamp portion 72

(FIG. 8) with a bore 73 therethrough to receive the shaft 50. The clamp has shanks 74 and 75 which are provided with aligned bores 76 and 77. The bore 76 in the shank 74 is threaded and bore 77 is countersunk to receive an Allen screw 78 to secure the clamp portion 72 of the pick-up unit 51 to the shaft 50.

The clamp portion 72 is provided with an extension 79 opposite the shanks 74 and 75 for mounting of an air distributor block 80 and suction members 81 and 82. The extension 79 has a bore 83 and in alignment therewith is a sleeve member 84 projecting from one side 85 of the extension 79. The bore 83 is countersunk as at 86, FIG. 8, for rotatably mounting the sleeve 84 through a threaded ring 87 engaging over a flange 88 on the sleeve 84. The air distributor block 80 is secured to the rotatable sleeve 84 by a clamp 89, whereby tightening of the clamp screw 90 will draw the clamp sections 91 and 92 together for a rigid mounting of the distributor block to the sleeve 84.

Figures 7, 8, 9:
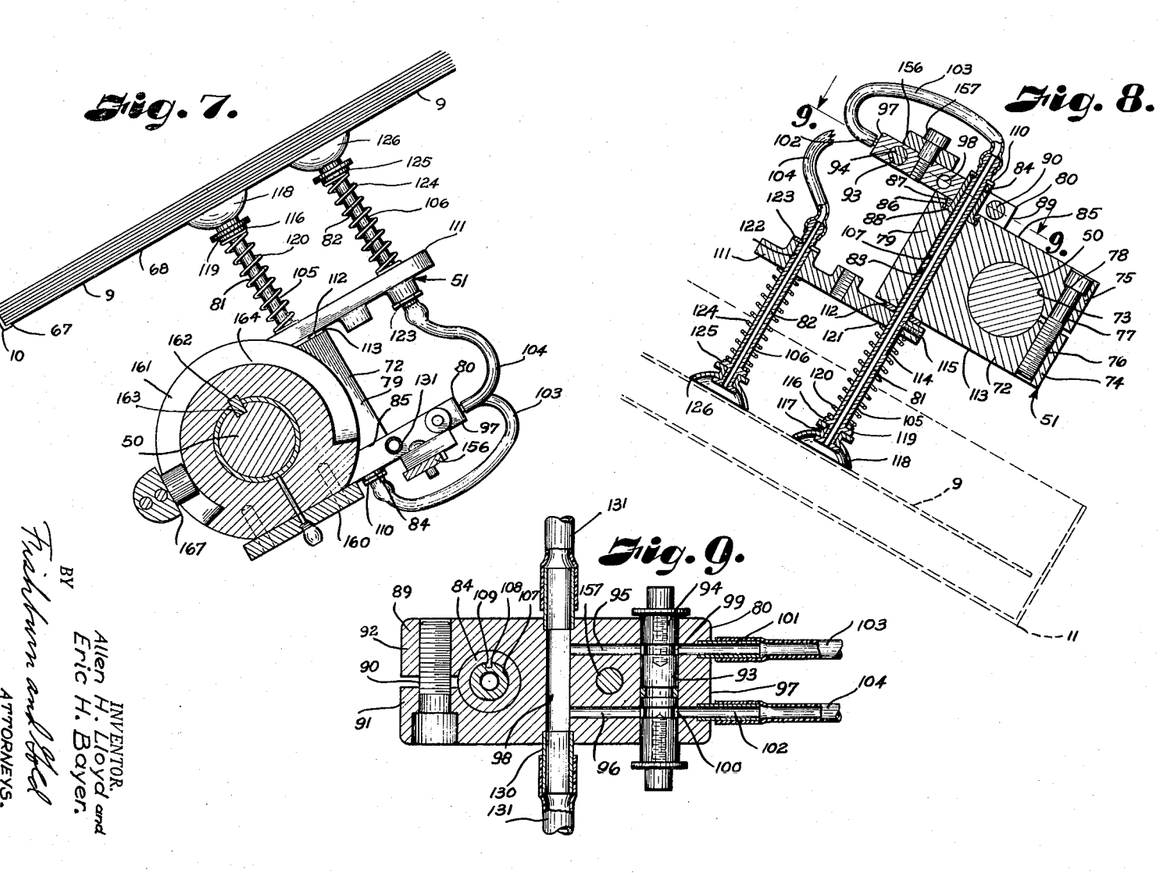
FIG. 7 is a sectional view through the push cam with the suction devices in pick-up position taken on a line 7—7, FIG. 4.
FIG. 8 is a section through the suction device mounting taken on a line 8—8, FIG. 4, the device being in the card dropping position.
FIG. 9 is a horizontal sectional view through the distributor block for the suction devices and valve therein taken on a line 9—9, FIG. 8.

In the illustrated structure, FIG. 9, the air distributor block is adapted to regulate the air suction through the suction members 81 and 82 and has a transverse bore 93 for receiving a valve plunger 94. The bore 93 is intercepted by longitudinal bores 95 and 96 extending from one end 97 of the block 80 to another transverse bore or air passage 98 approximately intermediate the distributor block 80. The valve plunger 94 is provided with annular grooves 99 and 100 spaced apart the same distance as the bores 95 and 96 for flow of air through said bores to the passage 98 when the grooves 99 and 100 are in alignment with the longitudinal bores 95 and 96. Movement of the plunger 94 to one side will close said bores 95 and 96 and thus stop the flow of air therethrough. The air passages 95 and 96 are provided with tube-like extensions 101 and 102 over which are sleeved ends of flexible hoses 103 and 104. The other ends of said hoses are engaged over hollow shafts 105 and 106 of the suction members 81 and 82 now to be described.

The upper portion 107 of the hollow shaft 105 extends through the bore 83 and sleeve 84 and has a key-way 108 (FIG. 9) for receiving a rib or the like 109 on the sleeve 84 for simultaneous rotation of the shaft 105 with the sleeve 84 and distributor block 80, and at the same time allowing the shaft 105 to move vertically in bores 83 and sleeve 84 for a purpose later described.

A lock ring 110 is provided on the shaft 105 above the sleeve 84 to limit the downward movement of said shaft. An arm 111 and washer 112 are sleeved over the shaft 105 near the side 113 of the extension 79, and said shaft has a groove or key-way 114 for a set screw 115 on the arm 111 loosely engaged in said groove to rotate the arm 111 with the shaft 105 but allow the shaft to move vertically with respect to the arm 111. The end 116 of the hollow shaft 105 is provided with an annular groove 117 for receiving a rubber suction cup member 118, and said shaft has an annular flange 119 above the groove 117 upon which rests one end of a coil spring 120, the other end of which engages against the lower side 121 of the arm 111, thus keeping the suction member 81 in a position as shown in FIG. 8, yet allowing the shaft 105 to rock vertically due to the spring 120.

The other end of the arm 111 has a bore 122 for receiving the hollow shaft 106 of the suction member 82, and a lock ring 123 is secured on said shaft above the arm 111. A coil spring 124 is provided on the shaft 106 between the shoulder 125 of the shaft and the side 121 of the arm 111 to keep the shaft in an extended position but also to allow a certain vertical movement. A flexible suction cup 126 is secured to the lower end of the shaft 106 in the same manner as on the suction member 81. The cups 118 and 126 on each pick-up unit 51 are provided to contact the lowermost card 68 in the hoppers 10 when in pick-up position as shown in FIG. 7, and the slidable mounting of each shaft 105 and 106 will cushion the impact of said contact as well as the flexibility of the cup members 118 and 126.

Each air passage 98 in the distributor block 80 is provided with tubular extensions 130 for connecting air hoses 131 thereto, thus interconnecting the air distributor blocks on each pick-up unit 51 with each other. Approximately midway of the row of distributor blocks 80, an air hose 132 intercepts hose 131, FIG. 12, said air hose 132 leading to a valve 133 mounted near the vertical frame 4 for regulating the flow of air in the air lines previously described. A hose 134 leads from the valve to a suction pump 135 for a purpose later described.

Pivotally mounted as at 136 (FIG. 12) to the rear portion 46 of the arm 43 is a rod 137 having its lower end extending through an opening 138 in a horizontal arm 139, said arm being pivotally mounted at one end 140 to a frame member 141. The other end of the arm 139 is pivotally connected as at 142 to a vertically extending valve rod 143 for operating the valve 133. The lower end of the rod 137 extends beyond the arm 139 and is provided with a stop nut 144, and another stop nut 145 is provided at a predetermined distance from the stop 144 above the arm 139 for a purpose now described.

As the forward end 49 of the arms 42, 43, 44 and 45 swing upwardly to bring the cup members 118 and 126 into contact with the lowermost card 68 in the hoppers 10 for pick-up operation, the rear portion 46 of the arm 43 will move downwardly, thus lowering the rod 137 until the stop member 145 engages the upper face of the arm 139 and pushes the forward end of the arm 139 with the valve rod 143 connected thereto downwardly to operate the valve 133. The timing of the mechanism 7 is such that this action takes place when the cup members 118 and 126 are near the contact point with the cards 68, FIG. 7. At this point, the valve 133 is opened, and the continuously running pump 135 sucks air through the suction cups 118 and 126, the hollow shafts 105 and 106, the hose lines 103 and 104, the air passages 95, 96 and 98 in the distributor blocks 80, and the air lines 131, 132 and 134, thus creating a vacuum to cause the cards 68 to adhere to the cup members for delivery to the boxes 11 on the conveyor 12.

As the forwards ends 49 of the arm 43, along with the forward ends of the arms 42, 44 and 45, with shafts 50 and the pick-up units 51 with cards 68 thereon swing downwardly toward the boxes 11, the valve 133 stays open until the lower stop nut 144 on the now upwardly moving rod 137 engages the lower face of the arm 139 and pulls the same with the valve rod 143 upwardly to close the valve, FIG. 11, to stop the suction therethrough and permit air (outside atmosphere) to enter through the valve into the air hoses and passages, which will cause the cards to drop into the boxes 11 as the timing of the mechanism 7 is such that the units 51 and cards 68 thereon are now exactly above said containers 11, FIG. 8.

In FIG. 11, we have illustrated one type of valve structure; however, we do not wish to be limited to the particular form as shown. The valve 133 (FIG. 11) has a housing 146 with a cylindrical bore 147 adapted to receive enlarged plunger portions 148 and 149 on the rod 143. The valve housing is provided with an inlet port 150 to which the hose 132 is connected, and an outlet port 151 connected with the air hose 134 and leading to the suction pump 135. As the valve rod 143 is pulled downwardly during the previously described operation to open the valve for pick-up action, the plunger portion 148 will be positioned above the inlet 150 as shown in dotted lines 152. The plunger portion 149 is then located below the outlet 151, as indicated at 153, and closing a bleeder opening 154. The air can now be drawn from the line 132 through the valve and out through the line 134 to create the desired vacuum for card pick-up action. As the mechanism swings into a card-dropping position, the valve plunger portions are moved upwardly into a position as shown in FIG. 11, thus allowing air to enter through the opening 154 to the line 134 and through an opening 155 to the line 132 to release the cards into the containers 11.

Figure 3:
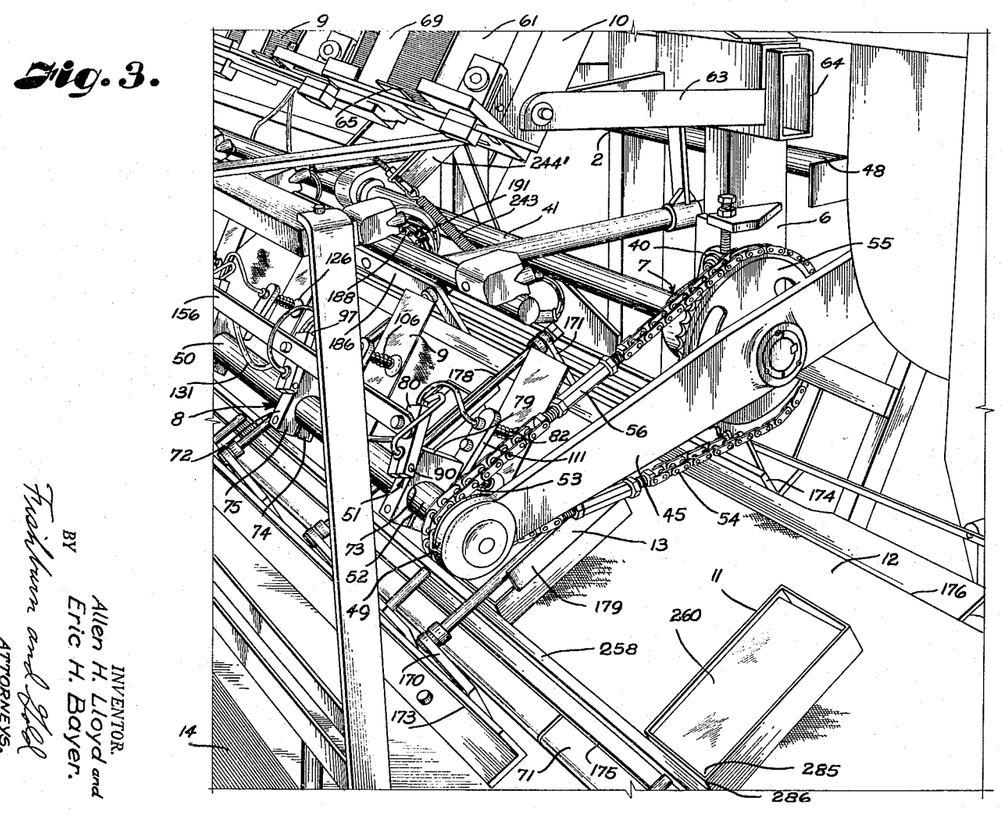
FIG. 3 is an enlarged partial perspective view of the other end of the card pick-up mechanism.

It has been previously stated that the distributor blocks 80 and suction members 81 and 82 rotate simultaneously with the sleeve 84 on clamp members 72. The purpose of this rotation is to align the cards 68 with the containers 11 on the conveyor 12. The card has been picked up from the hopper 10 where it was placed at a forty-five (45) degree angle with respect to the containers 11 as shown in FIGS. 4 and 5. To accomplish this alignment of the cards 68 with containers 11 while traveling from the pick-up position to the delivery or depositing position, FIG. 6, we provide a link rod connection 156 between the distributor blocks 80 to assure uniform movement of the pick-up units 51. The rod 156 is pivotally connected to the blocks 80 as at 157, FIG. 8, and one end 158, FIG. 5, has a link connection 159 with an arm 160 extending from a push cam 161 on the shaft 50 near the arm 42 as shown in FIGS. 3 and 5. The push cam 161 is keyed to the shaft 50 as at 162, FIG. 7; however, the key-way 163 in the shaft 50 is substantially longer than the width of the push cam 161, FIG. 5, to prevent any rotation of the cam 161 on the shaft 50 but to allow a certain horizontal movement on said shaft. The disc-like push cam 161 is provided with a groove 164 extending partially around its circumference from the sides 165 to the side 166 as shown in FIGS. 4 and 7. A cam finger 167 is mounted on the inner side 168 of the arm 42 and engages in the groove 164 in the cam 161. As the mechanism 7 swings the shaft 50 with the pick-up units 51 thereon up and down, the shaft will rotate in the forward ends 49 of the arms 42, 43, 44 and 45 approximately 120 degrees due to the chain connection 54 whereby the cam finger 167 sliding in the curved groove 164 will draw the push cam 161 towards the arm 42, thus pulling the link 159 and rod 158 with the pick-up units 51 connected thereto a set distance to the left, FIG. 5, to bring the pick-up units pivotally mounted on clamps 72 with the cards 68 thereon into alignment with the containers 11, before said cards are dropped.

In operation of the gates or stops 13, we provide opposite gate brackets 170 and 171, FIG. 13, suitably secured as by bolts or the like 172 to side rails 173 and 174 of the frame structure 2 near the sides 175 and 176 of the conveyor belt 12. The gate brackets 170 and 171, which extend substantially above the conveyor belt 12, are provided with openings 177 for rotatably mounting gate shafts 178. Suitably secured to said shafts are plates 179 extending toward the belt 12 when in container stopping position. One end 180 of the gate shafts extend beyond the gate brackets 171 and secured to said ends 180 as by clamping or the like 181 are gate levers 182. The lower ends of the gate levers 182 have an opening 183, FIG. 2, for pivotally mounting as at 184 a link rod 185, thus connecting said gate levers with each other for a simultaneous operation of the gates 13.

Figure 14:
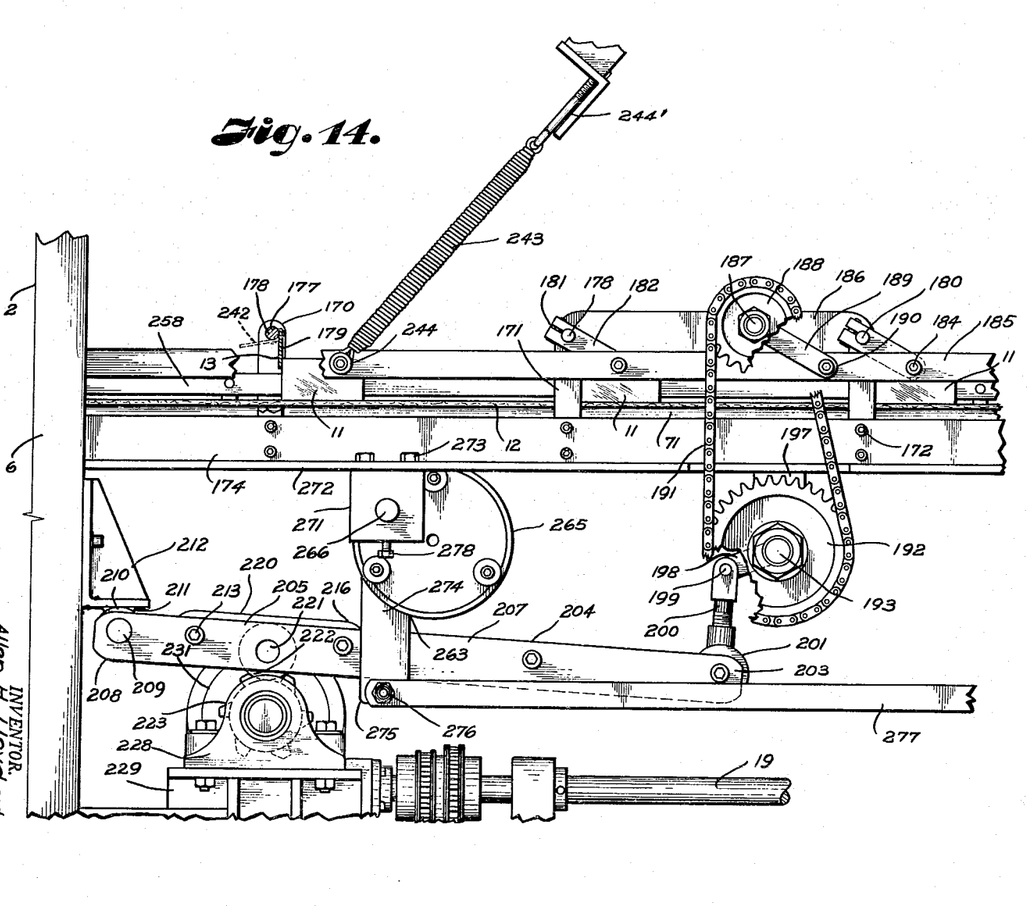
FIG. 14 is a rear elevation of the gate control with parts broken away for better illustration of the structure thereof.

Rotatably mounted to a connector 186 between two gate brackets 171 near the vertical frame section 6 is an outwardly extending short shaft 187 (FIG. 13) upon which is rigidly secured a sprocket 188. Also rigidly secured to the rotating shaft 187 between the sprocket 188 and connector 186 is an arm 189, one end 190 thereof being pivotally connected with the link rod 185 similarly to the gate levers 182 for a purpose later described. The sprocket 188 has a chain link connection 191 with a larger sprocket 192 rigidly mounted on a shaft 193 below the sprocket 188. The shaft 193 is rotatably mounted in bearings 194 and 195 carried on brackets 196 and 197, said brackets extending below the frame rails 173 and 175. Rigidly secured to the shaft 193 between bearings 194 and 195 is an arm 198, the other end of said arm being pivotally connected as at 199 to one end of an adjustable link 200 as shown in FIG. 14. The link 200 is provided with a transverse sleeve portion 201 which engages over a shaft 202 connecting the forward or free ends 203 of a cam yoke 204 of a gate control 205, FIG. 15, now to be described.

Figure 15:
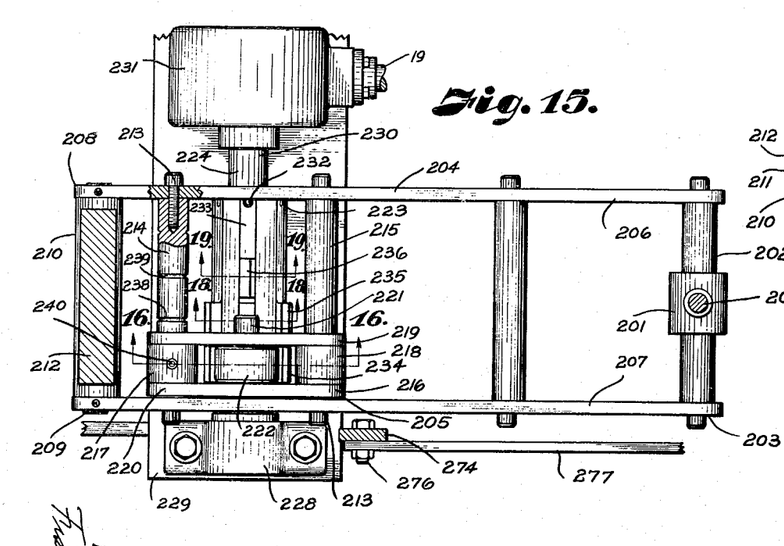
FIG. 15 is a horizontal sectional view through the gate control taken on a line 15—15, FIG. 13.
Figure 16:
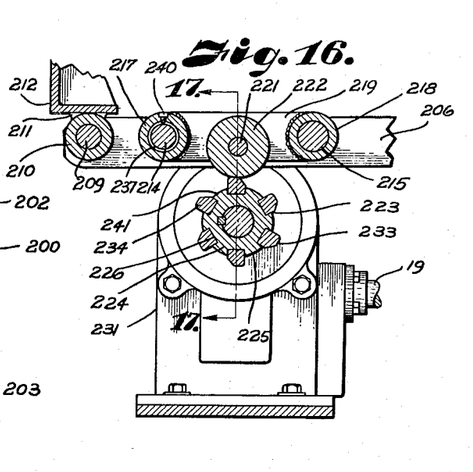
FIG. 16 is a partial sectional view through the gate control and gate cam taken on a line 16—16, FIG. 15.

The cam yoke 204 provides side members 206 and 207, the rearward ends 208 thereof being connected through a shaft 209. The shaft 209 is rotatably secured within a sleeve or bearing member 210 which in turn is rigidly secured as by welding or the like 211 to a bracket 212 on the frame portion 6. With this structure so far described, the cam yoke 204 may rock freely upon the axis provided by the shaft 209. Mounted near the rearward ends 208 of the cam yoke by bolts or the like 213 and between the side members 206 and 207 are shaft-like cross members 214 and 215 for slidably mounting of a roller carriage 216. The roller carriage 216 consists of sleeve portions 217 and 218 engaged over shafts 214 and 215 and connecting side members 219 and 220 suitably secured as by welding to each side of the sleeve portions as shown in FIGS. 15 and 16. Rotatably mounted between the side members 219 and 220 on a shaft 221 is a roller 222 extending substantially below the side members, FIG. 16, in engagement with a gate cam structure 223 mounted below said roller 222.

Figure 17:
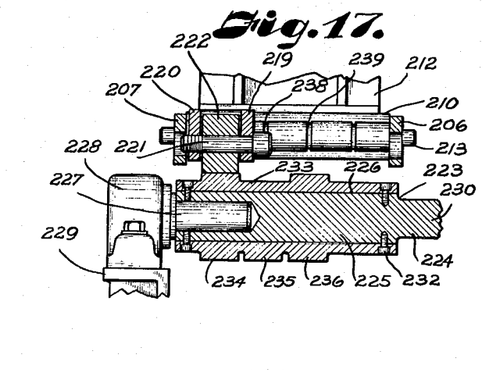
FIG. 17 is a longitudinal section through the gate cam taken on a line 17—17, FIG. 16.

The movements of the containers are controlled by a suitable mechanism which includes a gate cam structure 223 which is composed of a cam shaft 224 having an enlarged portion 225, FIG. 17, the latter being provided with longitudinal grooves 226. The cam shaft 224 is at one side suitably supported as at 227, FIG. 17, in a bearing 228 mounted on a frame extension 229 near the bottom of the frame 2. The other end 230 of the shaft 224 extends into a gear housing 231 containing a speed reduction unit (not shown). The gears in the housing 231 provide a driving connection between the cam shaft 224 and the jack shaft 19 driven by motor 16 to operate the gate control 205.

Figure 18:
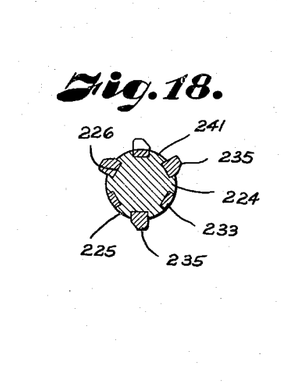
FIG. 18 is a section through the gate cam on line 18—18, FIG. 15.

In the present structure, six longitudinal grooves 226 are provided at equal intervals around the circumference of the shaft portion 225. Removably secured in said grooves 226 by bolts 232 are lobe-bars 233 machined in such a manner as to provide three different cam actions. In FIG. 16, we have shown a sectional view through the cam shaft and lobes near its outer end wherein all six lobes extend beyond the periphery of the shaft as at 234 providing one type of cam action. Adjacent thereof, as shown in FIG. 18, only three lobes extend beyond the periphery of the cam shaft as at 235 providing a different cam action if so desired, and in FIG. 19 we have shown still another cam action with only two projecting lobes as indicated at 236.

Due to the slidable mounting of the roller carriage 216, said carriage may be adjusted so that the roller 222 aligns with one of the three types of cams. For this purpose, we provide annular grooves 237, 238 and 239 in the cross member 214 adapted to be engaged by a set screw 240 extending through the sleeve 217 for proper alignment with either cam 234, 235 or 236 for a purpose now described.

As the cam shaft 224 is rotated in the described manner, the lobes 233 thereon will push against the lower portion of the roller 222 at certain intervals, as shown in FIG. 16, thus forcing the roller and the forward portion 203 of the cam yoke 204 connected therewith upwardly until said lobe has by-passed and the roller has dropped into the dwell 241 between the lobes. This creates a constant up and down movement of the forward portion 203 which in turn rotates the shaft 193 a short distance forward and backward due to the connection of the link 200 and the arm 198 between the yoke and the shaft 193. It is obvious that the sprocket 192 will follow the movement of the shaft 193, and the chain 191 will transfer this semi-rotation to the sprocket 188 which, in turn, will swing the arm 189 on the shaft 187 forwardly and backwardly. This movement is transferred over the link rod 185, gate levers 182 and gate shafts 178 to the gates 13 which will open simultaneously as the roller is raised by the lobes as at 242, FIG. 14. A spring 243 is provided above the gate structure near frame portion 6 and has its lower end connected as at 244 to link rod 185 and its upper end to a frame extension as at 244′, FIG. 4, to aid in closing of the gates 13.

Figure 2:
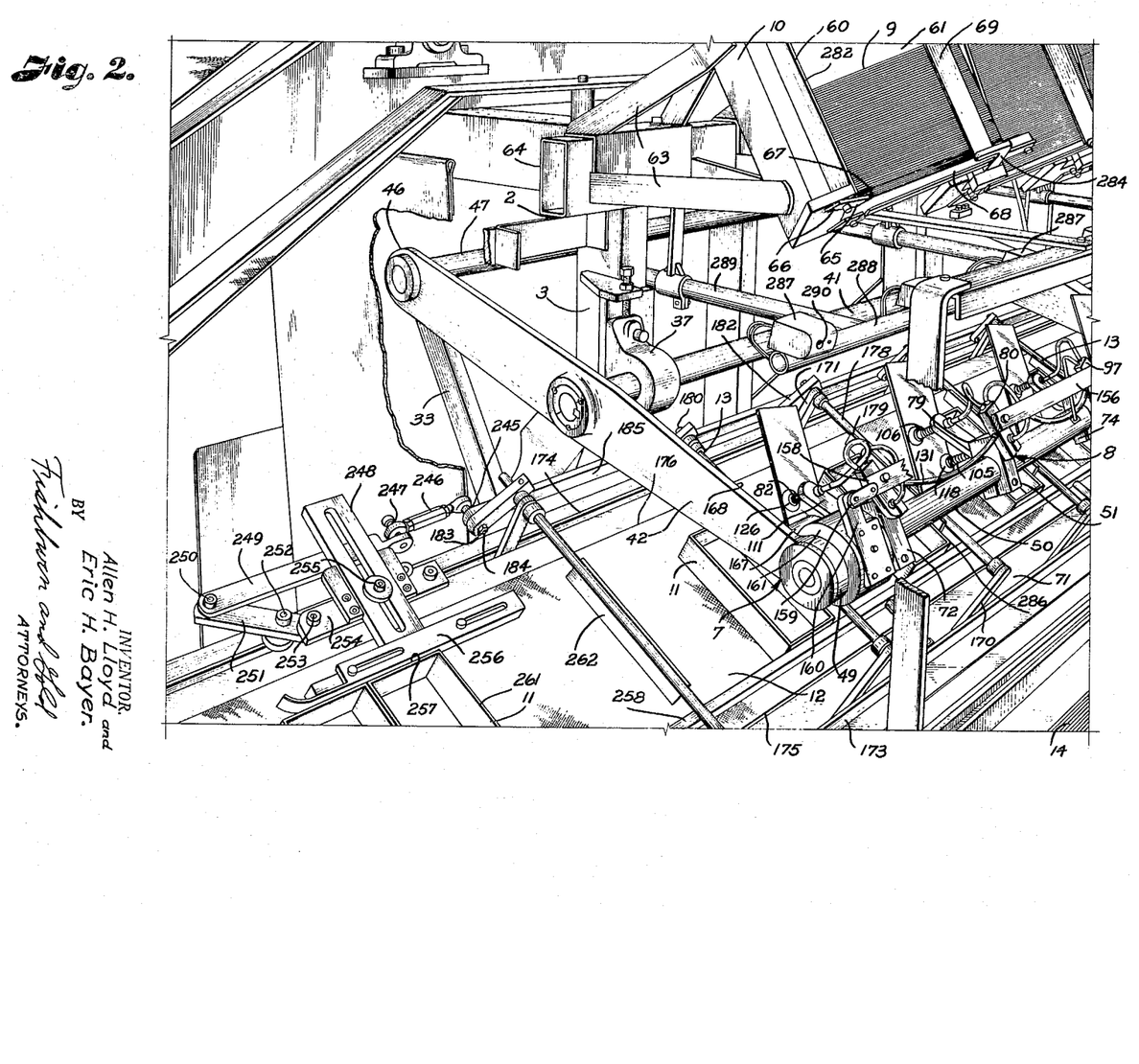
FIG. 2 is an enlarged partial perspective view of the collator, particularly illustrating one end of the card pick-up mechanism with the card rotating push cam thereon.

Pivotally connected by bolt 184 at the forward end 245 near the arm 42 is one end of a link 246, FIG. 2. The other end is connected as at 247 to a regulator 248 for feeding the containers 11 to the collator 1. The link 246 connects to a push arm 249, the other end of said arm being pivotally connected as at 250 to a link 251. The link 251 is rotatably secured near its center as at 252 to frame portion 71 and its other end connects through a bolt 253 to an arm 254 upon which is adjustably mounted as at 255 a shoe-like member 256 adapted to engage one side 257 of the containers 11 and press said containers against a guide bar 258 running the length of the collator above the conveyor belt near the side 175 thereof to stop further feeding of the containers to the collator at certain intervals.

Figure 1:
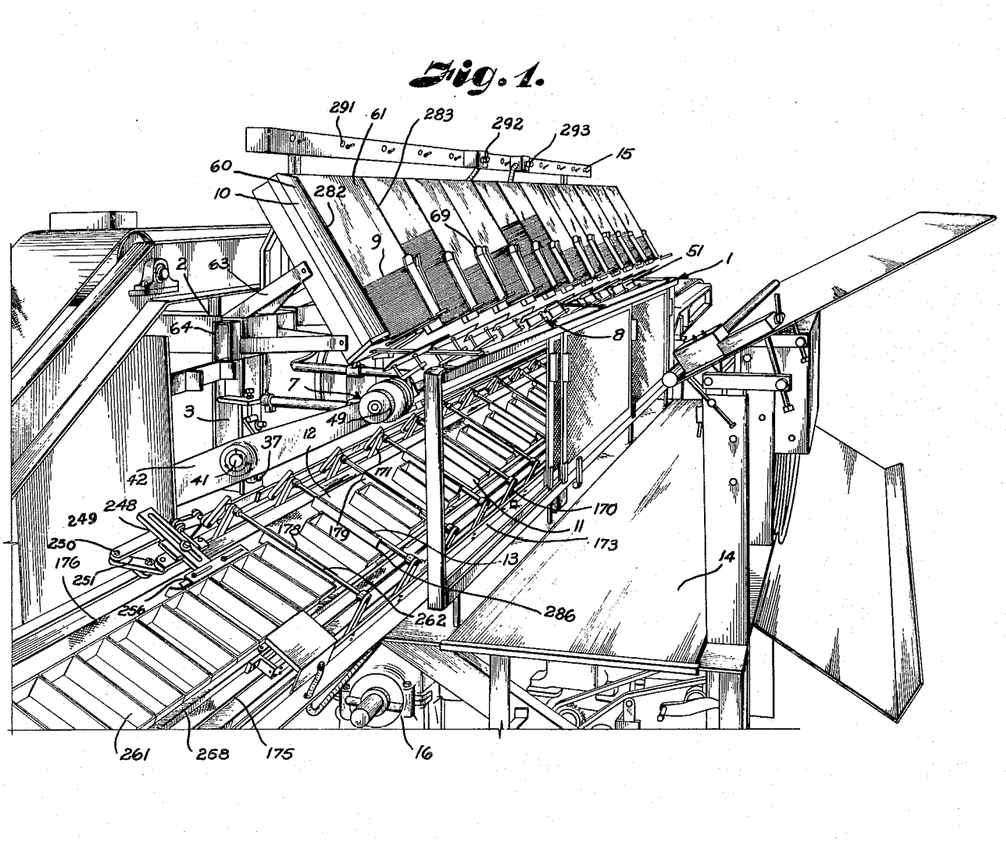
FIG. 1 is a perspective view of a collator constructed in accordance with the present invention.

In describing the purpose of the gate stops 13 and regulator 248, it is assumed that twelve cards may be delivered at one time to the containers 11 by the row of pick-up units 51 as shown in the present structure, FIG. 1. If it is desired to deliver only twelve cards to each container, that is, only one card at each of the twelve stops, the roller carriage 216 is to be adjusted to align with the gate cam 234 whereby due to the six lobes thereon the gates 13 will open after every card delivery by the pick-up units 51 to allow the containers 11 to move to the next gate for the next card delivery, and so on, until the container has passed the twelve gates and received the twelve cards desired. It will be obvious that the timing of the mechanism 7 and the gate control 205 will be such that an accurate and corresponding operation of card delivery and movement of the containers from one gate stop to the next is accomplished.

If it is desired to deliver two cards to each container at each stop, the roller 222 is brought into alignment with the cam 235, FIG. 18. In this position, the cam action is reduced to half with respect to the cam 234, thus keeping the gate 13 closed for twice the time as when using the cam 234. This allows the pick-up units 51 to travel twice from hopper 10 to container 11 for delivery of two cards at each gate stop. As the containers travel through the collator and receive two cards at each stop, twenty-four cards will be contained in the boxes 11 after passing the last gate 13 as indicated at 260, FIG. 3.

Figure 19:
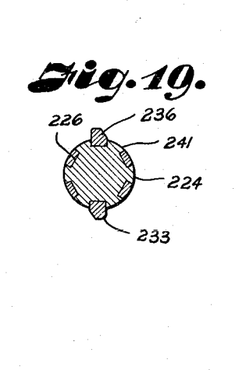
FIG. 19 is a section through the gate cam on line 19—19, FIG. 15.

For a three card delivery at each stop, gate cam 236, FIG. 19, is used, thus filling each container 11 with thirty-six cards after the twelve delivery stops have been passed and the container continues to travel on the conveyor 12 to another place of operation such as placing a cover over the containers for future shipment.

The regulator 248 for feeding the empty containers 11 to the collator as previously described operates in unison with the gates 13. As the link rod 185 moves backwardly to open the gates, the link and push cam connection 246 and 249 will also move backwardly with said rod and pull the forward end of the link 251 (FIG. 2) outwardly away from the conveyor 12. This movement causes the other end of the link 251 with the regulator mounted thereon by bolt 253 to swing inwardly toward the conveyor, thus engaging the brake shoe 256 with the container sides 257 to hold the row 261 of containers 11 to prevent movement towards the collator. A container previously positioned and stopped at the entry gate 262 has now started moving towards the first gate 13. As the gates 13 close for card delivery, the operation of container regulator is reversed, thereby the shoe 256 moves a slight distance away from the sides 257 of the containers to allow the next container to travel towards the entry gate 262 where it will stop until the gates open again for movement of the containers to the next stop whereby the next container will pass through the gate 262 to enter the collator.

As previously stated, the shoe 256 is adjustably attached to the arm 254 by a bolt 255 for the purpose of adjusting the regulator to containers of different length with respect to the distance between the guide bar 258 and the container side 257.

In FIGS. 13 and 14, we have illustrated a device 263 for adjusting the frame structure 71 carrying the conveyor belt 12, said device being mounted near the frame posts 6. This adjusting device is necessary to accommodate containers of larger or smaller height than the containers shown in FIG. 14 to allow said containers to pass freely below the gate shafts 178. This is accomplished by the eccentric mounting of the rollers 264 and 265 on a shaft 266. Said rollers engage as at 267 (FIG. 13) a cross member 268 of the conveyor frame structure 71. The shaft 266 upon which the rollers 264 and 265 are rigidly mounted as at 269 is rotatably secured in bearing blocks 270 and 271, and said bearings are mounted to the lower sides 272 of the side rails 173 and 174 by bolts or the like 273. A downwardly extending arm 274 is welded or otherwise rigidly secured to the shaft 266, and its lower end 275 is pivotally connected as at 276 to a horizontal rod 277 leading to another identical adjusting device near the frame posts 3 (not shown). Movement of the rod 277 to the left or right will rotate the shaft 266 with the eccentric mounting rollers thereon and either lower or raise the conveyor frame 71 between the side rails 173 and 174 with respect to the gates 13. Set screws 278 are provided in the bearing blocks 270 and 271 for engagement with the shaft 266, and tightening of the set screws will lock the adjusting device 263 to hold the conveyor frame 71 in the desired position.

To accommodate different size cards in hoppers 10 in correspondence with the above-mentioned containers, only a simple operation is necessary. As earlier described, the hoppers or chutes 10 are constructed in an angle-shaped form, whereby only portions of the sides 280 and 281 of the cards 9 rest against the sides 60 and 61, FIG. 2, of the hoppers, thus allowing an unlimited variation in the lengths of said card sides which may extend beyond the forward edges 282 and 283 of the hopper sides 60 and 61, thus requiring only a readjustment of the guide brackets 69 by simply moving said brackets outwardly or inwardly on the arm 284 as shown in FIG. 2.

Cards of different size as shown in the accompanying drawings will not affect the operation of the mechanism 7, nor the operation of the pick-up units 51. Since the edge portion 285 on the cards 9 is always located at the same point when stacked in the hoppers 10, and the corner portion 286 in boxes 11 located at the same point when stopped on gate 13 on guide bar 258, no matter how far the sides 280 and 281 of the cards and the corresponding sides of the containers may extend from the portions 285 and 286, the line of travel performed by the edge portion 285 on the pick-up unit 51 to the corner portion 286 will always remain the same, thus requiring no readjustment of the collator in this respect.

Operation of a device constructed and assembled as described is as follows:

A container 11 is placed at each gate 13 on the continuously running conveyor belt 12 below each hopper 10 and a sufficient number of such containers are lined up forwardly of the regulator 248 for feeding the containers to the collator as shown in FIG. 1. Stacks of cards or the like 9 are placed on the twelve hoppers with the face portion of the cards facing the conveyor belt. Assuming only twelve cards are to be deposited in each container, that is, one card at each container stop or gate, the gate control 205 is adjusted accordingly by aligning the roller 222 with cam portion 234 as shown in FIG. 16, having six extending lobes, whereby the gates will open after each card's delivery as previously described. The collator is now ready for operation.

The motor 16 is actuated, which in turn will rotate the jack shaft 19 through the variable speed drive 17 and speed reducer 18. The jack shaft has driving connection with the crank shafts 26 and 27, which in turn rotate the twin cranks 30 and 31 for up and down movement of the forward portions 49 of the arms 42, 43, 44 and 45 on the shaft 41 which has connection through rods 33, 34, 35 and 36 with said twin cranks 30 and 31. In the present structure twelve card pick-up units 51 are mounted on the shaft 50, which is rotatably secured in the forward ends 49 of the arms 42, 43, 44 and 45. As the arms 42, 43, 44 and 45 rock up and down, the pick-up units 51 obviously follow this movement, thereby performing a certain line of travel between the hoppers and the containers for picking up the cards and depositing them in the containers. As the pick-up units rock up and down they also perform a forward rotation towards the frame structure, as illustrated in FIG. 6, due to the chain and sprocket arrangement between shafts 41 and 52, FIG. 12. At the same time, the pick-up units swing or rotate the cards through an angle of about forty-five (45) degrees on an axis normal to the face of the cards, as shown in FIGS. 4 and 5, to align the cards with the containers through cam arrangement 161 as previously described.

After the first card is picked up and deposited and the units start to swing upwardly, the timing of the mechanism is such that the gate control will open and then close the gates to allow the containers to travel to the next gate or stop for another card delivery until each container has received one card at each of the twelve stops.

It will be understood that the number of cards delivered at each stop may be changed to two or three by adjusting the gate control with respect to the types of cams as shown in FIGS. 18 and 19. During this operation the regulator 248 will feed one container to the entry gate 262 after every gate operation to assure continuous and proper feeding of empty containers to the belt of the collator. As the mechanism 7 is operated as described, the air suction pump 135 is also actuated for creating a suction or a vacuum in the pick-up units to accomplish the picking of the cards from the hoppers and adhere the cards to the units when traveling from the hoppers to the containers. The air valve 133 is operated in the already described manner to create the suction for picking up the cards and to break said suction for depositing the cards into the containers 11. The position of the hoppers in relation to the containers on the belt is such that one right angle of the card will always fit precisely in the lower right-hand corner of the container regardless of the size of the container. The cards are picked up vertically instead of pulling the cards sideways from the stack. The belt continuously moves and the containers are stopped by the stop mechanism until the required number of cards are placed therein from the respective hoppers.

The collator is provided, as is usual in apparatus of this character, with a plurality of photoelectric cells as indicated at 287 (FIG. 2) mounted on a tubular rod or the like 288 between the chutes 10 which hold the cards 9 and the boxes 11 in which the cards are deposited by the pick-up mechanism 51. The rod 288 is supported by rearwardly extending members 289 suitably secured to the framework structure 2, also as illustrated in FIG. 2. A cell 287 is located at each pick-up mechanism so that when the pick-up mechanism removes the card from the chute it will pass near the photoelectric cell 287 on its travel to the box 11, thereby reflecting the light from the eye 290 back to the cell. Should the pick-up mechanism fail to pick the card up, the photoelectric cell will operate to energize a light 291 mounted upon a frame above the framework structure as best illustrated in FIG. 1. Of course, it will be obvious that a signal light 291 is necessary for each photoelectric cell, and when the lights are energized then the operator can stop the operation of the machine to remedy the error by the switches as indicated at 292 and 293.

The collator constructed and operated as described is characterized by its ease of make-ready, simplicity of operation, accuracy of card delivery and time-saving adjustment for cards and containers of different size so that a predetermined amount of greeting cards or the like may be delivered to the containers in a fast and accurate manner, thus accomplishing an economical operation of the collator for the manufacturer.

What we claim and desire to secure by Letters Patent is:

1. A collator of the character described for simultaneously picking up a card or the like from each of a plurality of stacks thereof and depositing them in respective containers comprising, a frame having spaced upright posts rearwardly thereof, a rocker frame mounted on said posts, said rocker frame including spaced rocker arms, a shaft on the forward ends of said rocker arms, a conveyor belt running longitudinally of said frame, spaced hoppers for retaining said stacks, said hoppers being secured to said frame spaced above said belt, said hoppers being located at an angle in transverse relation to said belt, spaced suction means mounted on said shaft on the forward ends of the rocker arms for picking up said cards, stop means on said frame for holding the containers in respective stop positions on the belt under the hoppers while the cards are moved from the stacks to the containers, means for intermittently feeding the containers to said belt in timed relation with movement of the containers to the next succeeding stop positions, said last named means cooperating with the suction means for moving the containers during the time the suction means are moving to pickup cards from said stacks, means for creating a partial vacuum in said suction means for securing cards thereto, means for destroying said partial vacuum for depositing said cards in the containers, and motor means for operating said rocker frame mechanism for movement of the forward ends of the arms up and down and for operating said stop means for alternately stopping and releasing the containers on the belt.

2. The apparatus of claim 1 wherein said upright posts have bearings spaced vertically thereon, an upper shaft and a lower shaft in said bearings, said spaced rocker arms being mounted on said upper shaft, a link rigidly connected to the lower shaft and a crank arm connected to the link and to a rocker arm.

3. The apparatus of claim 2 including means on the hoppers for adjusting the size thereof to accommodate cards of different sizes.

4. The apparatus of claim 1 wherein said means for creating a partial vacuum in said suction means comprises a pump and air lines, and said means for destroying said partial vacuum comprises a valve operable by the rocker arms for intermittently bleeding air to the suction means.

5. The apparatus of claim 1 wherein said suction means comprises spaced blocks carrying suction cups, and a valve operable upon the rocking of said rocker arms for periodically bleeding air to said suction cups for destroying said partial vacuum to drop said cards into the containers.

6. The apparatus of claim 1 including cam means for retaining said containers in stop positions beneath said hoppers for more than one cycle of said rocker arms permitting a plurality of cards to be deposited in said containers before movement thereof by said belt to the next succeeding hopper.

7. A collator of the character described for simultaneously picking up a card or the like from each of a plurality of stacks thereof and depositing them in respective containers comprising, a frame having supporting means thereon, oscillating means mounted on said supporting means and adapted to oscillate with respect to said frame, a shaft mounted on said oscillating means and adapted to oscillate therewith between a first and a second location, a conveyor belt running longitudinally of said shaft and having a portion thereof located at said second location, said belt being adapted to carry said containers thereon, spaced hoppers for retaining said stacks of cards, said hoppers being spaced from said belt and located at said first location, spaced gripping means mounted on said shaft and adapted to oscillate therewith and pick up said cards from said stacks at said first location, stop means on said frame for intermittently retaining the respective containers in respective stop positions on said belt at said second location for receiving said cards from said gripping means, means for releasing the containers for movement on said belt in timed relation to the oscillation of said gripping means, said last-named means cooperating with the gripping means for permitting movement of the containers during the time the gripping means are absent from said second location, means for actuating said gripping means to maintain a grip on the cards while said gripping means are traveling from said first location to said second location, and means for actuating said gripping means to release said cards when said gripping means are at said second location whereby said cards are released for deposition in said containers.

8. The apparatus of claim 7 including means for rotating said shaft with respect to said oscillating means for presenting said gripping means to said cards at a different angle than said gripping means deposits said cards in said containers.

9. The apparatus of claim 7 including means for rotating said gripping means on an axis normal to the face of said cards during travel from said first location to said second location.

References Cited in the file of this patent
UNITED STATES PATENTS

| | | |
|---|---|---|
| 1,818,065 | Jones | Aug. 11, 1931 |
| 2,753,180 | Thomas | July 3, 1956 |
| 2,819,073 | Murray | Jan. 7, 1958 |
| 2,827,287 | Gross et al. | Mar. 18, 1958 |